United States Patent [19]

Giraud

[11] Patent Number: 5,556,673
[45] Date of Patent: Sep. 17, 1996

[54] TRANSPARENT COMPOSITE STRUCTURAL ELEMENTS AND METHODS FOR PRODUCING SAME

[75] Inventor: André Giraud, Levallois-Perret, France

[73] Assignee: Compagnie Generale D'Innovation et de Developpement COGIDEV, Rueil Malmaison, France

[21] Appl. No.: 182,206
[22] PCT Filed: Jul. 6, 1992
[86] PCT No.: PCT/FR92/00642
§ 371 Date: Jan. 7, 1994
§ 102(e) Date: Jan. 7, 1994
[87] PCT Pub. No.: WO93/01372
PCT Pub. Date: Jan. 21, 1993

[30] Foreign Application Priority Data

Jul. 8, 1991 [FR] France .................. 91 08552

[51] Int. Cl.[6] ...................................... B32B 9/00
[52] U.S. Cl. .................. 428/34.4; 428/34.5; 428/34.6; 428/36.3; 428/36.9
[58] Field of Search ................ 428/34.4, 34.5, 428/34.6, 36.3, 36.9

[56] References Cited

U.S. PATENT DOCUMENTS

| 3,002,534 | 10/1961 | Noland | 138/141 |
|---|---|---|---|
| 3,896,858 | 7/1975 | Whatley | 138/130 |
| 4,247,258 | 1/1981 | Griffee, Jr. et al. | 416/230 |

FOREIGN PATENT DOCUMENTS

| 257132 | 9/1967 | Austria . | |
|---|---|---|---|
| 353397 | 2/1990 | European Pat. Off. . | |
| 147973 | 12/1902 | Germany . | |
| 324941 | 5/1919 | Germany . | |
| 2408935 | 9/1974 | Germany . | |
| 2314622 | 4/1976 | Germany . | |
| 8007192 | 7/1980 | Germany . | |
| 2906259 | 8/1980 | Germany . | |
| 290206 | 7/1953 | Switzerland . | |

OTHER PUBLICATIONS

WO, A, 8 900 917—Feb. 9, 1989 see the whole document.

*Primary Examiner*—Patrick J. Ryan
*Assistant Examiner*—Cathy Lee
*Attorney, Agent, or Firm*—Cushman Darby & Cushman, L.L.P.

[57] ABSTRACT

These transparent members, capable of withstanding mechanical stresses, comprise at least one glass member (A1) of stem, reed, tube, strip or sheet type and/or glass members (A2) of bead, particle or fragment type, transparent fibers (B) and a cured transparent resin (C) in which the fibers (B) and the members (A2) are embedded; the fibers (B) and the resin (C) with which they are coated being bonded to the members (A1), the resin (C) being chosen so as to exhibit, in the cured state, a refractive index which does not differ, at a wavelength of 510–520 nm, by more than 0.001 from that of the fibers (B) and from that of the members (A1) and (A2), it being nevertheless possible for the difference in index between the resin (C) and the members (A1) of strip or sheet type to range up to 0.01 when these members are large in dimension in relation to the overall structural member. It is thus possible to manufacture elongate members of pillar type (view in section below), of sheet, planar or curved type, and objects of more complex shapes.

30 Claims, 3 Drawing Sheets

TRANSPARENT COMPOSITE STRUCTURAL ELEMENTS AND METHODS FOR PRODUCING SAME

FIELD OF THE INVENTION

The present invention relates to transparent composite structural elements or members capable of withstanding mechanical stresses and having for this purpose properties such as compressive, tensile and flexural strength, rigidity and, absence of brittleness.

Such structural members can be employed, inter alia, to replace some conventional structures, made of metal or reinforced concrete, with structures which have identical mechanical characteristics but which are transparent, this making it possible in particular to give them an aesthetic character, or else to ensure better transmission of light especially in constructions, hangars, swimming pools, greenhouses, store windows, storage vessels and some components of automobile bodies which could advantageously be transparent, for example the uprights surrounding the windows and the windshield.

The invention therefore finds its application in many fields such as those of building, public works, urban furniture, naval or automobile construction and the like. In fact, the structural members according to the invention can take on various shapes ranging from simple shapes to more complex shapes.

By way of examples, there may be mentioned elongate members of the pillar, pylon, post, beam, arch or similar type, members of sheet type, both planar and curved, as well as objects of much more complex shape. Particular mention may be made of vertical structures of the post or pylon type used as supports for constructions or for the conductors of electric or telephone aerial transmission lines, aeration shafts or those for extracting gases, fumes and steam, road signposts, posts for grid fencing, for glazing buildings, building facade panels, cladding panels, bottoms of boats and other craft, water towers, gas tanks, silos, transmitting or receiving antennas, cranes and lifting equipment and the like.

PRIOR ART

The present invention makes it possible in particular to replace conventional posts or pylons made of metal or reinforced concrete, or at least a proportion of these, with transparent posts or pylons that will be capable of blending more harmoniously into the scenery.

Transparent materials known hitherto do not satisfy the combination of the characteristics required for the above applications:

glass does not withstand, for example, high flexural forces; moreover, it is brittle;

less brittle, transparent plastics do not withstand high tensile or compressive forces; as a general rule they are also very costly, their cost greatly exceeding that of glass;

fibers, especially of glass, have remarkable tensile properties, but not those of compression or rigidity, and they are costly.

It is well known that mechanical properties of plastics can be modified and greatly improved by incorporating long or short fibers. However, the products obtained are translucent or even opaque in great thicknesses.

Swiss Patent CH-A-290 206 relates to a transparent member comprising two parallel transparent sheets between which is arranged a layer which has transparent fibers and which is bonded adhesively by a binder to at least one of the sheets. Polyacrylates, polystyrene, vinyl compounds and cellulose esters are mentioned as binder.

SUMMARY OF THE INVENTION

The objective of the present invention is to provide structural members such as referred to above, in the case of which the best possible compromise can be obtained between the mechanical properties sought after and transparency.

To meet this objective, there are proposed, in accordance with the present invention, transparent composite structural members based on three categories of different components, namely massive glass components, transparent fibers and a transparent matrix and/or coating resin, the refractive indices of these three components having furthermore to satisfy particular conditions and, with regard to the structure. the regions of maximum tensile stress and/or to the regions of impact strength of the member to be produced, those of the massive glass members, to the regions where the maximum compressive strength and the greatest rigidity is called for, the resin being employed for filling the gaps between the glass members and the fibers and to ensure the cohesion of the whole.

The subject of the present invention is therefore a transparent composite structural member capable of withstanding mechanical stresses, which comprises:

at least one glass member (A1) of the stem, reed, tube, strip, sheet or similar type and/or glass members (A2) of the bead, particle or fragment type;

transparent fibers (B); and a cured transparent resin (C) in which the fibers (B) and the glass members (A2) are embedded, the fibers (B) and the resin (C) with which they are coated being bonded to the glass member (or members) (A1) and being arranged in order to protect the latter against impacts and/or to make it possible to obtain the required mechanical properties, said resin (C) being furthermore chosen so as to exhibit, in the cured state, a refractive index which, at a wavelength of 510 to 520 nm, does not differ by more than 0.001 from that of the fibers (B) and from that of the glass members (A1) and (A2), it being nevertheless possible for the difference in index between the resin (C) and the glass members (A1) and/or (A2) to be up to 0.01 when these members are large in size in relation to the overall structural member in question. It may be considered that such members of large size are, for example, massive glass fragments of dimensions greater than 1/10 of the smallest dimension of said structural member.

The glass (A1) and (A2)

There is no particular limitation as to the type of massive glass which can be employed according to the invention, provided that the abovementioned conditions relating to the differences in refractive index with the other constituents of the final structural member are adhered to.

In the case where glass beads are employed it is advantageous, in order to obtain better mechanical properties, to provide not a homogeneous particle size but a distribution comprising a number of particle sizes. Thus, if D is the diameter of the large particles, very good results have been obtained by tamping very energetically a mixture comprising, by volume, approximately 90% of beads of diameter D, 2.5% of beads of diameter 0.225 D, 1% of beads of diameter 0.1 D and very fine dust (for example ground glass fiber). When the tamping cannot be so energetic, which may be the case in some manufacturing processes employing viscous polymerizable compounds for forming the resin matrix (C), the best particle size distribution is different. Thus, in another case where there was less tamping, approximately 55% by volume of beads of diameter D, 20% of beads of diameter 0.7 D, 5% of beads of diameter 0.25 D and very fine dust were required. To put things simply, it is advantageous to employ, by volume, 70 to 90% of large particles, 3 to 5% of intermediate particles (1/10 to 1/5 of the diameter of the latter) and very fine dust. The latter has the advantage of being in the form of microbeads and of being mixed directly with the viscous liquid, the rheological properties of which it may even improve, thus facilitating some conversion processes (extrusion, mold filling) as will be described later.

The diameter of the largest particles will be a few centimeters, but in any event smaller by at least an order of magnitude than the dimensions of the structural member to be produced.

The fibers (B)

There is no particular theoretical limitation either as to the type of transparent fibers (B) that can be employed, provided that the abovementioned conditions relating to the differences in refractive index with the other constituents of the final structural member are adhered to.

The fibers (B) are preferably industrial glass fibers; there may be mentioned, inter alia, E, D or R glass fibers marketed by the company "Vetrotex International", which have the following refractive indices:

E glass=1,550–1.557;

D glass =approximately 1.47;

R glass =approximately 1.54.

There is nothing against employing a glass quality for the members (A1) and (A2) which is different from that employed for the glass fibers (B), which are generally more costly, as long as the conditions laid down for the refractive indices are adhered to.

Nevertheless, natural or artificial silica fibers as well as organic fibers such as aromatic polyamide fibers may also be mentioned. However, in this latter case it will be made certain that the manufacture of the structural members does not require the resin (C) composition to be heated to temperatures that are too high.

Depending on the applications, the fibers (B) may be used in the form of long fibers (several meters or more in length), optionally woven or assembled as sheets or rovings or in the form of staple fibers (a few millimeters in length). These fibers have preferably been subjected to a sizing operation or to a surface treatment to facilitate coupling and bonding with the resin (C).

The resin (C)

The resin (C) is made from a polymer, of a copolymer, or of a mixture of curable transparent polymers and/or copolymers, such as chiefly unsaturated polyesters, polyurethanes, polyalkyl methacrylates crosslinked by the addition of a functionalized (meth)acrylate, partially crosslinked polybutadienes, interpenetrating or semiinterpenetrating networks of styrene or alkyl methacrylate and urethane, and the like. It can also be made from at least one transparent polymer or copolymer such as those based on styrene, alkyl methacrylate, vinyl chloride, vinyl acetate, vinyl alcohol, acrylonitrile, polycarbonates, polyaromatics, polyamides and polycellulosics. These latter polymers and copolymers must therefore be considered as also included within the definition of the resin (C) according to the invention.

Use is made of at least one monomer, one polymer, one prepolymer, one polycondensation product or one polymerizable composition, in the liquid state, capable of producing, by polymerization, copolymerization, condensation or crosslinking, if need be under the effect of heat or of at least one chemical agent such as a curing catalyst, crosslinking agent and the like, a transparent hard matrix. The initial liquid materials or compositions must have a viscosity which is sufficiently low to make it possible to obtain, in the processing conditions which are described below, an intimate mixture with the fibers (B) and, if appropriate, with the members of type (A2), while avoiding the presence of gas bubbles which would introduce optical defects in the final product.

In some cases the resin (C) may be obtained from a single monomer giving a transparent polymer directly by itself, with a refractive index which is substantially identical with that of the glass components.

However, in most cases the resin (C) is obtained from at least two components (monomers, prepolymers, polymerizable compositions) of different refractive indices in order to obtain a transparent resin (C) whose refractive index can be varied, by adjusting the proportions of these components, from a value lower than that of the refractive index of the fibers (B) and of the members (A1) and/or (A2) to a higher value. The proportions adopted for these components are those that, after polymerization, make it possible to obtain a polymer with a refractive index which is substantially identical with that of the glass components.

Thus, while methyl methacrylate, considered alone, gives a polymer with a refractive index of 1.491, the polymerization of a mixture of approximately 70% by weight of acrylonitrile and approximately 30% by weight of methyl methacrylate results in a polymer with an index of 1.510, compatible with a glass with an index of 1.509, for example (index difference not exceeding 0.001).

Similarly, polymerization of pure styrene gives a "crystal" polymer with an index of 1.590; the addition of a little styrene in methyl methacrylate makes it possible to obtain a polymer with an index which is higher than that of polymethyl methacrylate, and therefore higher than 1.491.

Other reasons for proceeding by starting with a mixture of at least two components can also be mentioned:

this mixture may make it possible to obtain properties other than transparency and the required mechanical properties (for example, to improve the impact strength or weather resistance);

since commercial products do not have a perfectly uniform composition it will thus be possible, using a slight adjustment in the proportions, to obtain the required refractive index with a high precision; the achievement of this condition is of great importance for obtaining a good transparency;

the processing conditions may be facilitated thereby; for example, the viscosity of the mixture is frequently an important characteristic for the conversion of plastics; now, this conversion can be affected by employing as components of the mixture a prepolymer and a liquid in which it is dissolved.

The transparent resin (C) is preferably an unsaturated polyester resin. Such resins are well known to a person skilled in the art. They are obtained by polycondensation of one or more diols with one or a number of saturated, unsaturated and optionally aromatic diacids (or acid dianhydrides). The unsaturated anhydride most widely employed is maleic anhydride; the aromatic units are generally introduced using phthalic, for example ortho-phthalic, anhydride.

Immediately after its synthesis the unsaturated polyester is stabilized and then mixed with at least one vinylaromatic monomer such as styrene. A catalyst such as a peroxide is generally added at the time of use and this, when heated at the time of the forming, initiates the polymerization of the whole. Acetylacetone peroxide and cyclohexanone peroxide may be mentioned as particular peroxides.

The unsaturated polyester resin compositions may also include additives such as quaternary ammonium compounds or ethoxylated tertiary amines which facilitate the wetting of the fibers (B), compounds such as methyl methacrylate, which improve transparency, inhibitors and accelerators. Unsaturated polyester resin compositions which have improved transparencies are, for example, those comprising a saturated (ortho-phthalic) polyester and a maleic unsaturated polyester.

The refractive indices of the cured unsaturated polyester resins are, in the wavelength range from 510 to 520 nm, generally approximately between 1.52 and 1.56. The refractive index can be adjusted by using a comonomer, such as methyl methacrylate or an itaconic acid ester, by mixing with another resin until the desired value is obtained, or by mixing two unsaturated polyesters of different indices.

The bonding between the three components of the structural member

The bonding between the fibers (B) embedded in the resin (C) and the glass member(s) (A1) and/or (A2) may be effected by direct adhesion of the resin (C) to the said member(s) (A1) and/or (A2).

Provision may also be made for facilitating this bonding—which is important for obtaining transparency and maintaining it—by a sizing operation or a surface treatment of the massive glass, of the type of sizing operation or surface treatment indicated with regard to the fibers (B).

The sizing agent is advantageously chosen as a function of the nature of the resin (C) employed. Thus, a silane-based mixture constitutes an agent for bridging between the glass members and resin (C). In the case where the resin (C) is a polyester, such a sizing agent may, for example, consist of a water solution of approximately 15% by weight of poly(vinyl acetate), of approximately 0.5% by weight of methacrylic silane and of approximately 20% by weight of a fatty acid amide. The silanes employed may correspond to the formula:

$$X_3Si(CH_2)_nY$$

in which n is between 0 and 3;

X is a hydrolyzable group; and

Y is an organic group selected as a function of its reactivity with the organic matrix.

Similarly, there are sizes which can be applied to organic fibers and which are capable of forming bridges between the polymer constituting the fiber and that constituting the matrix, by virtue of polyfunctional molecules. These sizing agents are very closely related to those employed in adhesives for plastics.

Provision may also be made for applying to the massive glass an intermediate bonding layer (D) made of a transparent plastic advantageously chosen to make it possible to absorb the differential expansion effects which could bring about a rupture of the bonding between the massive glass and the resin. Polyvinylbutyral may be mentioned as an example of these bonding and absorbing plastics, applied as a thin layer (of the order of 1 to 10 μm) to the massive glass, for example by spraying or coating and, if appropriate, curing.

Furthermore, in the case where a number of glass members (A1) are employed for a single final structural member, said glass members (A1) may be bonded together using resin (C).

Relative proportions and arrangements of the three constituents of the structural member, and examples of use The proportions and the arrangements of the three main constituents of the structural members according to the invention depend on the application being considered and the required performance, and may vary within wide limits. In general, staple fibers are employed for improving impact strength, long fibers for obtaining good rigidity and good tensile strength, and glass members (A1) and/or (A2) for increasing the rigidity and the compressive strength and to reduce the cost of manufacture. Since stresses are not homogeneous inside the structural members to be produced, this will be taken into account in the relative arrangement of the constituents, the optimized material then exhibiting a heterogeneous macrostructure, combining microstructure regions which are homogeneous but different. The regions which are subject to the highest tensile stresses will be enriched chiefly in long fibers, the regions situated at the periphery receiving staple fibers, the regions under compressive loads, or else not subject to high stresses, being filled with massive glass members.

The overall quantity of the glass members may vary within wide limits; it is commonly from 30 to 50% by volume in the fiber-filled regions.

Thus, if the intention is to produce a structure which bears only relatively moderate forces (a transparent massive member working chiefly in compression), a random bulk mixture of staple fibers (a few millimeters in length), of glass particles and of resin may be produced, the fibers representing approximately 2 to 3% by volume of the total and the particles between 30 and 80%. An embedded beam working in flexure may be taken as an example of a high-performance article. It will then be appropriate to arrange a high percentage of fibers in the regions subject to high tensile stresses, that is to say at the periphery, and a high percentage of particles in the regions where the stresses are low (cost economy) or in those where the compressive stresses are high, that is to say in the center. In the former regions, the percentage of fibers may reach 50 to 55% by volume, in the latter regions the percentage of particles may even approach 75 to 80% by volume.

In another particular embodiment of the present invention, the structural member is intended to constitute an elongate member such as a pillar, a pylon, a post, a beam, an arch or the like. It then comprises a backbone consisting of at least one glass member (A1) or of glass members (A2) bonded together using resin (C), the fibers (B) embedded in the resin (C) being arranged so as to surround the backbone while being bonded to it.

In particular, the backbone consists of a glass tube or stem (A1), a core formed by glass fragments and/or beads (A2) embedded in the resin (C), a bundle of glass reeds or stems optionally assembled by adhesive bonding with the resin (C) or glass sheets (A1) assembled using resin (B) in order to form an elongate hollow core of polygonal section, the backbone being surrounded by a sheath which is integrally attached to it and which consists of at least one sheathing layer applied around the backbone by filamentary winding of a glass fiber roving (B) impregnated with curable transparent resin (C), or by wrapping with a glass fiber fabric (B) impregnated with curable transparent resin (C), the whole having been subjected to curing of the resin (C) for impregnating the fibers (B), with optional interposition, between said backbone and the first sheathing layer, of a layer of size for the backbone or of a layer (D) of bonding plastic, making it possible in particular to absorb the differential expansion effects which could bring about a rupture as a result of the variations in temperature between the backbone and the sheath.

In the case where the backbone consists of a glass tube, it is advantageously possible to obtain a transparent post or pylon whose length may reach 15 m, which can be employed as a support for aerial lines. The tube employed may have a diameter ranging up to 1 m and a thickness ranging up to 10 cm.

In this case, the fibers (B) may be advantageously glass fibers which have been used in the form of a roving impregnated with curable transparent resin and wound around the glass tube (A1) as adjoining turns of roving in order to form at least one layer for sheathing the tube (A1).

The sheath may comprise from 2 to 20 layers and, in particular, from 4 to 10 layers.

If such a structural member is intended to be subjected to tensile stresses, which is frequently the case, it may be found advantageous to make the glass fibers absorb a proportion of the tensile stress. Thus, for each of the sheathing layers which are obtained by helical winding of the roving, the pitch of the helix can be adjusted as a function of the required properties. In this case, too, and if at least two layers of sheathing are envisaged, the helices of two successive layers may be oriented in an opposite manner. In the case where the structural member is intended to be subjected to compressive stresses, which is the case with some pylon members, a quasi-circumferential winding of the roving may be envisaged for each of the sheathing layers. Any combination of helical and circumferential windings may obviously be envisaged for the different layers of the same structural member of this type. Lengthwise sheets of roving may also be arranged between two layers.

The surface of such a structural member may be preferably subjected to an adjustment, and may comprise a layer of a varnish (E) protecting against the action of oxygen and of ultraviolet radiation. Varnishes of polyurethane type, to which an activator is generally added at the time of use, may be mentioned as varnishes that can be employed for this purpose.

This elongate structural member, as just defined, may be manufactured by a process comprising the operations of:

performing a filamentary winding of a glass fiber roving (B) impregnated with curable resin (C), around the glass tube (A1) intended to form the backbone of the structural member, in order to form at least one, preferably, at least two layers of sheathing of the tube (A1);

immediately after the gelling of the resin (C) begins, winding around the tube (A1), thus endowed with its sheath, a film (F) which is neutral towards the resin and capable of protecting the surface of the member from the effect of oxygen and of correcting any surface microcorrugations;

leaving the member wrapped in neutral film (F) at a temperature of 15° to 40° C. for a period of 1 to 10 hours to allow the resin (C) to cure;

unreeling the neutral film (F);

if appropriate, adjusting the surface of the tube obtained so as to eliminate the surface defects due to the reeling of the film (F) without reaching the glass fibers (B); and;

if appropriate, applying to the surface of the resulting structural member, for example by spraying, a varnish (E) which protects against the action of the UV and of oxygen.

Before performing the filament winding, the tube is advantageously coated with a layer (D)—as defined above—for bonding to the first layer of sheathing to be applied.

The protective neutral film employed is advantageously a polyester film, for example a film marketed under the name of "Mylar" by the DuPont company, which is in the form of a ribbon or sheet.

In accordance with another embodiment of the invention, the structural member is in the form of a transparent sheet or of a transparent tube, rigid and nonbrittle, made from a layer of glass fragments and/or beads (A2), which is applied onto a glass fiber fabric (B) or sandwiched between two glass fiber fabrics (B) in a coating of cured resin (C). To obtain such a sandwichtype sheet, a layer of glass fibers which is impregnated with curable resin (C) may be arranged in the bottom of a mold, the curable resin (C) mixed with the members (A2) may be poured to form the intermediate layer, a second sheet of impregnated fibers may be placed, and curing may then be performed. To obtain a two-layer or three-layer tube of this type, a rotating cylindrical mold may be employed, and there may be thrown successively against its inner wall a layer of glass fiber fabric, followed by a mixture of resin + members (A2) and then, if appropriate, by another layer of glass fabric.

In the simplest case, fibers and members (A2) which are intimately mixed in the resin (C) before it is cured are dispersed, and the polymerization is next carried out. A homogeneous and isotropic material is thus obtained, unless the device allows an orienting force to remain (lamination, extrusion or molding without sufficient viscosity or agitation).

In general, however, the aim is to produce a heterogeneous and anisotropic composition so as better to absorb and/or to distribute mechanical stresses. One technique consists in prearranging the fibers and the particles according to the desired scheme (for example in a mold for heat-curable resin) and, while taking care to avoid allowing air bubbles to remain, embedding the whole, thus arranged, in the viscous mixture which is delivered into the mold and which subsequently cures under the effect of temperature and of the polymerization agents added to the mixture (peroxides or the like).

For some applications, the production of the material may be effected by progressively mixing the different components. Thus, the manufacture of a section by pultrusion may be effected by first preparing the mixture of the glass particles and the prepolymer, the sheet of fibers then being charged into this mixture before passing through the pultrusion die.

The manufacture of structural members according to the invention is therefore performed by making use of known techniques such as molding using contact, in vacuum, by spraying, or in a press, injection molding, centrifuging, reeling, calendering, pultrusion, extrusion, filament winding and the like. The choice of the method depends on the properties of the resin (C) which is chosen and on the desired arrangement of the glass members within the structural member. The production of the latter may also take place in a number of stages. Thus, to produce a cylindrical post it is possible, for example, to mold the center of the article by employing the mixture of glass beads (A2) and resin (C) and then to perform the laying of a glass fabric impregnated with the organic component around the core thus formed, or else to prepare by pultrusion, sticks of fibers embedded in the resin, these sticks being then incorporated in a molding or extrusion operation so as to be finally incorporated into the remainder of the mixture of matrix + beads and the like.

BRIEF DESCRIPTION OF THE DRAWINGS

To illustrate further the objective of the present invention and the numerous embodiments which are possible, a description thereof will be given below, by way of examples which are purely illustrative and non-limiting, of a number of embodiments shown in the attached drawing. In the examples, the percentages are given by weight, unless otherwise indicated.

In the drawing.

EXAMPLE 1

Manufacture of transparent sheets which have excellent mechanical properties

Members (A2) consisting of glass microbeads which have the following composition:

$SiO_2$: 53–54%;

$Al_2O_3$: 14–15%;

CaO+MgO: 20–24%;

$B_2O_3$: 6.5–9%;

F: 0–0.7% and glass fibers (B) in the form of fabric, of the same composition, are employed; to form the resin (C) a polyester prepolymer is employed to which a few percent of styrene are added to adjust the refractive index to that of the glass.

A mixture of the prepolymer and of the microbeads is prepared. Two tapes of glass fiber fabric are passed continuously through the prepolymer to which 1–2% of methyl ethyl ketone peroxide have been added, in order to preimpregnate them with the prepolymer, which gels during their travel.

Figure 6:
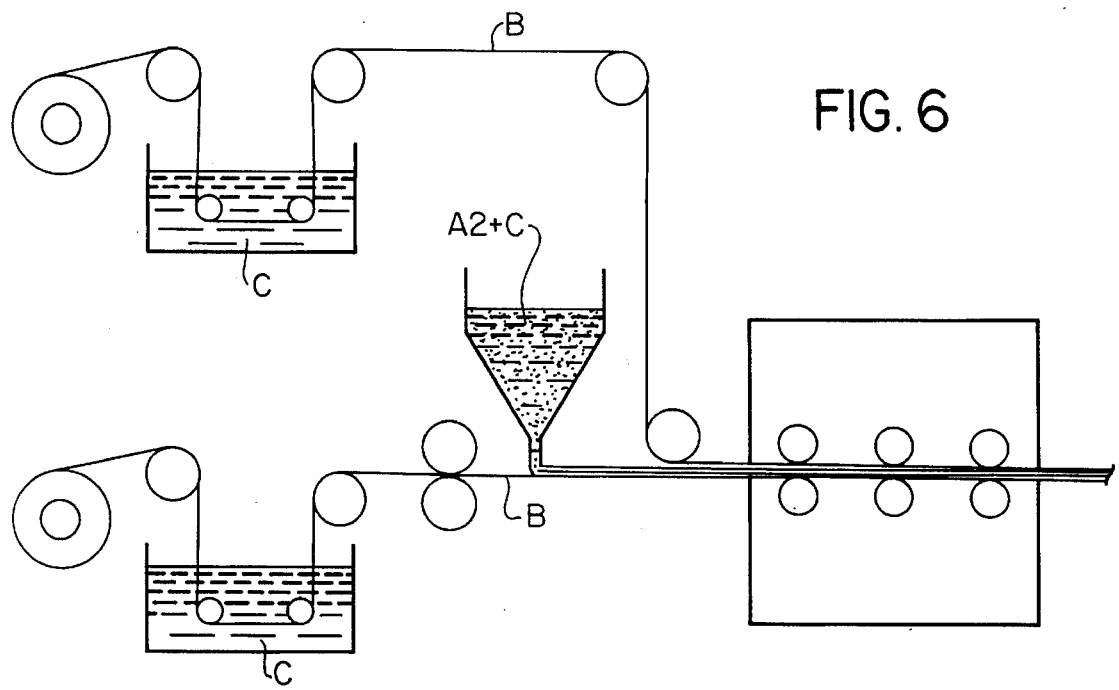
FIG. 6 illustrates diagrammatically the continuous manufacture of a flat structural member similar to that shown in FIG. 5.

A layer of a resin-microbead mix is deposited continuously on the first tape of preimpregnated fabric, before proceeding to the lamination of the two tapes, and to passing the whole through a polymerization oven where the composite cures while passing between rolls which control its thickness and its surface quality. The diagram in FIG. 6 illustrates this embodiment.

After postcuring, transparent sheets which have excellent mechanical properties are obtained.

EXAMPLE 2

Manufacture of hollow transparent elongate members (glass content: approximately 70%

Figure 1:
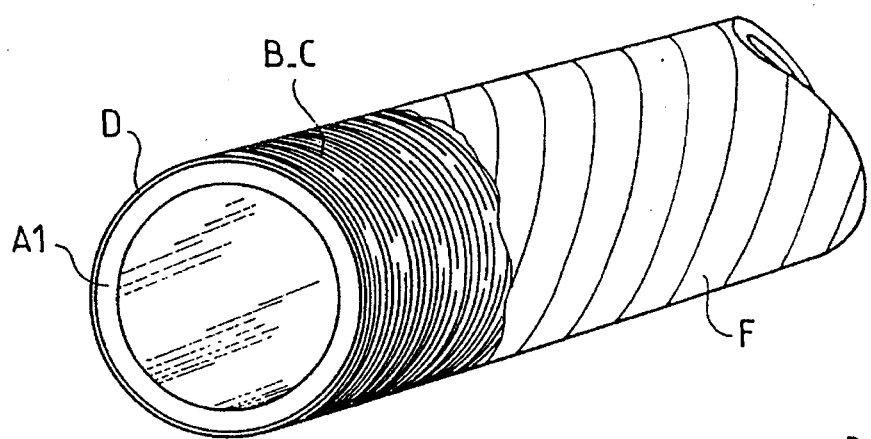
FIG. 1 is a perspective view of a tubular structural member in accordance with a first embodiment of the invention, in the course of manufacture.
Figure 2:
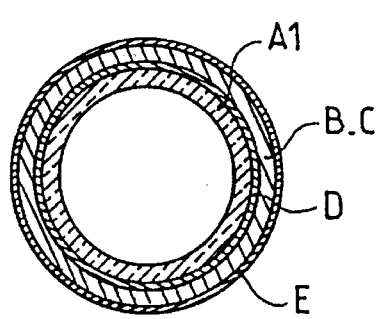
FIG. 2 is a view in cross-section of the member of FIG. 1, after finishing.

If reference is made to FIGS. 1 and 2, it can be seen that (A1) has been used to denote a glass tube surrounded by a sheath obtained by circumferential filamentary winding, in a number of successive layers, of a glass fiber roving (B) impregnated with a curable resin (C), and by curing this resin. An intermediate layer (D) promoting the bonding of the sheath (B-C) to the glass tube (A1) is placed between the tube (A1) and the first layer of sheathing. An outer coat of varnish (E) protects the tube from the effects of oxygen and UV radiation.

This structural member is manufactured by performing the following successive stages:

(a) the surface of a glass tube 500 mm in length, 60 mm in outer diameter and 4 mm in thickness is degreased with solvent;

(b) the outer surface of the glass tube is treated by applying with a pad a solution of silane A174 (marketed by Union Carbide) and drying for 15 minutes at 40° C.;

(c) using filamentary winding on a Baer machine, a plurality of layers (for example 4 to 10 layers) of a glass fiber roving with a linear density of the order of 50 tex are applied around the tube, the roving being marketed by Vetrotex International under the name "VETROTEX 5136", impregnated with an unsaturated polyester resin composition formulated as follows:

| | |
|---|---|
| Unsaturated polyester resin in solution in styrene and methyl methacrylate, marketed by Cray Valley under the name "NORSODYNE Q 2300 ML" | 93% |
| Styrene | 7% |
| | 100% |
| Cobalt octoate at a concentration of 6% in a phthalate, marketed by Akzo under the name "NL51" | 0.05% |
| Quaternary ammonium (promoter), marketed by Akzo under the name "ARQUAD 550" | 0.03% |
| Para-tert-butylcatechol (inhibitor) at a concentration of 10% in a phthalate, marketed by Akzo under the name "NLC10" | 0.1% |
| Cyclohexanone peroxide, marketed under the name "CYCLONOX CNL" | 1.5% |
| Protective agent against ultraviolet radiation, marketed by Ciba-Geigy under the name "TINUVIN 770 DF" | 0.15% |

This filamentary winding is performed quasi-circumferentially, with adjoining turns, the thickness of one layer in the finished structural member being on the order of 0.1–0.2 mm.

(d) after the winding stage the beginning of the gelling of the polyester resin is observed and, at this precise time, a tape of 50 mm wide MYLAR film is wound helically around the coated tube, leaving free spaces between the turns on the order of approximately 1 mm in order to control the exudation of the resin during the crosslinking stage, to entrain the air bubbles included between the film and the surface of the coated tube;

(e) after the resin has cured cold, the MYLAR tape is unwound and an adjustment of the surface is then conducted by rubbing down, without reaching the fibers; such an adjustment makes it possible to remove the surface defects caused by the reeling of the MYLAR tape, in particular the marks between the turns and the residual porosities;

(f) a polyurethane varnish (DuPont 120 S + activator 125 S system) is then applied by gun-spraying, cold; the transparency of the initial structure, intended to be produced by the use of glass, fibers and resin of refractive indices corresponding to the conditions of the invention, is then recovered, without surface defects.

EXAMPLE 3

Manufacture of an elongate structural member with use of the polyester resin compositions of Example 2

Figure 3:
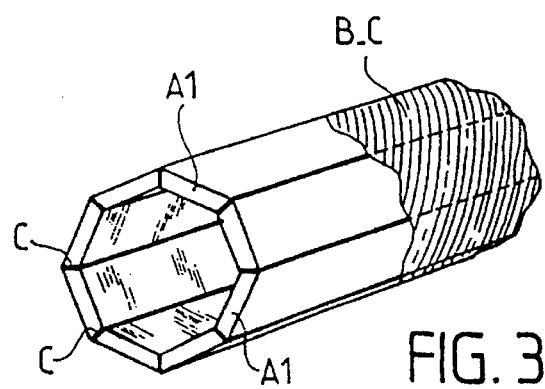
FIGS. 3 and 4 are perspective views, similar to FIG. 1, of a second and of a third embodiment of the invention, respectively.

FIG. 3 shows an elongate structural member obtained by adhesive bonding, using curable resin (C), of eight strips of glass (A1) to form a hollow core of octagonal section, and then by helical filamentary winding of a glass fiber roving (B) impregnated with curable resin (C), the process being then continued as indicated for the embodiment described in Example 2.

Figure 4:
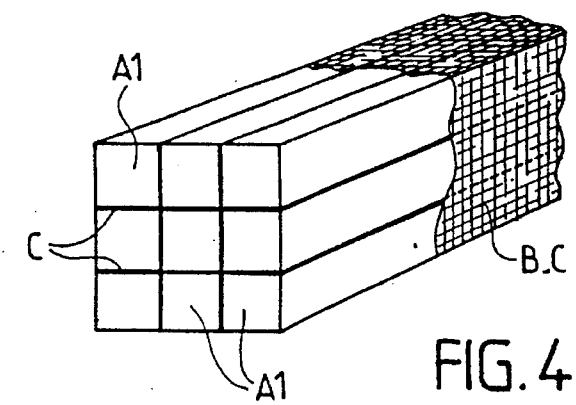

FIG. 4 also shows an elongate structural member whose solid core, of square section, is made up of nine small glass rolls of square section applied against one another, and whose protective sheathing is formed by wrapping a glass fabric (B) impregnated with curable resin (C), the process being then conducted as indicated for the embodiment described in Example 2.

EXAMPLE 4

Manufacture of a transparent windowpane which has excellent mechanical properties The components (A2) employed consist of R glass particles (microbeads and dust) whose composition can vary somewhat around the following typical composition:

$SiO_2$: 60%;

$Al_2O_3$: 25%;

CaO: 9%;

MgO: 6%;

together with R glass fibers (B) in the form of fabric which has the same composition; to form the resin (C), methyl methacrylate and phenyl methacrylate are mixed, the former representing 35–40% of the mixture and the proportion being adjusted accurately to obtain, after polymerization, the exact refractive index of the R glass.

A mold is employed in which the lower part consists of a planar sheet. A first layer of glass fiber fabric is arranged on the latter, and a thin layer (<1 mm) of the monomer preparation to which 1–2% of benzoyl peroxide has been added is cast, ensuring that the fabric is well impregnated and avoiding leaving small bubbles remaining in the interstices of the fabric. For this purpose, the mold has been placed under vacuum before the mixture is poured. After gelling (approximately 15 min), a second layer of approximately 2 mm of the monomerperoxide mixture is cast, into which the above-mentioned members (A2) have been incorporated (glass/resin ratio = approximately 60/40). After gelling, a second layer of glass fabric is arranged at the surface, and a new thin layer of the monomer-peroxide mixture is cast in the same way as before.

The polymerization of the resin is conducted by placing the mold in the oven; the polymerization can be accelerated by uniform and moderate heating of the mold, while avoiding temperature excesses which would be due to a runaway polymerization.

After polymerization, a transparent sheet is removed from the mold, containing only 50% of resin, whose outer surface is polished and which forms a windowpane which can be thermoformed after a preliminary stoving at 120°–150° C.

Figure 5:
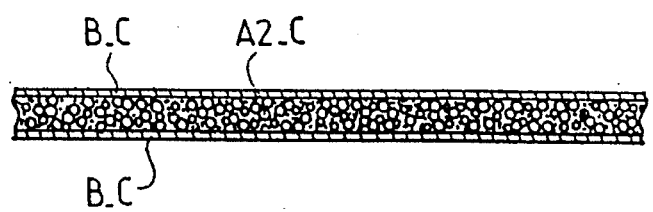
FIG. 5 is a view in section of a flat structural member in accordance with a fourth embodiment of the present invention.

The structure obtained is shown in section in FIG. 5. The resin (C) of Example 2 can be employed to obtain a structure of the same type with a glass with a matching refractive index.

EXAMPLE 5

Manufacture of a tube with very high flexural and axial compressive strength

Figure 7A:
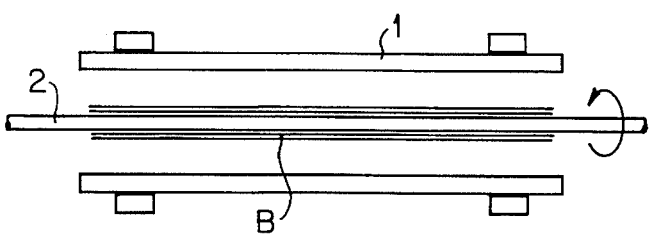
FIGS. 7a to 7c illustrate diagrammatically the manufacture of a tubular structural member in accordance with a fifth embodiment.

Members (A2), fibers (B) and a resin (C) of the same type as those employed in Example 1 or 4 are employed, together with the mold 1 shown diagrammatically in FIG. 7, consisting of a rotating cylinder.

Figure 7B:
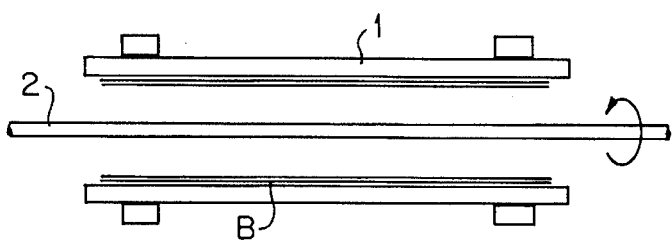
Figure 7C:
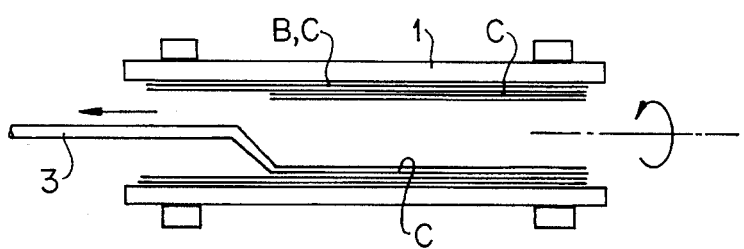

A glass fiber fabric (B) is wound onto a stem 2 and is then introduced along the axis of the cylinder 1 (FIG. 7a); the fabric is then transferred and laid flat by centrifuging against the inner wall of the cylinder 1 (FIG. 7b). At least one layer of fabric (B) is formed, depending on the desired mechanical properties. The monomer-peroxide mixture of Example 4 or the prepolymer of Example 1, in which the members (A2) have been incorporated in bead form, is then introduced through a dip pipe 3, the dip pipe 3 running all along the length of the rotating tube, along its axis as shown diagrammatically in FIG. 7c.

The parameters such as the dimensions of the dip pipe, the speed of travel, the flow rate and the like can be adjusted to obtain the desired thickness. If desired, at least one inner layer of glass fiber fabric can then be arranged using the same process as before. The centrifuging, which is continued until a sufficient cure, the mold being optionally heated, gives directly two smooth faces of the strong tube.

EXAMPLE 6

Manufacture of a beam liable to be subjected to high loads

Use is made of members (A2) of R glass as defined in Example 4, which is in the form of a mixture of beads 5 and 3.5 mm in diameter and of powder, and fibers (B) of the same glass in the form of sheets or rovings; to form the resin (C), a first prepolymer is employed, originating from the condensation of ortho-phthalic anhydride and of ethylene glycol (⅔ by weight of anhydride per ⅓ by weight of ethylene glycol), to which 5% of methyl methacrylate and 0.5% of cobalt octoate have been added, and a second prepolymer originating from the same condensation and to which 5% of styrene and 0.4% of benzoyl peroxide have been added.

Successive layers of sheets of fibers (B) and of members (A2) are stacked in a parallelepipedal mold so that there is, in all, 15% by volume of fibers and 60% by volume of members (A2). Then, 48 parts of the solution of the first prepolymer are mixed, below 10° C., with 52 parts of the solution of the second, these percentages having been determined by hot polymerization of samples of mixture in variable proportions of the two solutions, with determination of the refractive index, and the proportions chosen being those that give a transparent polymer with a refractive index of 1.541.

The mixture is agitated for 3 minutes and is then introduced slowly through the bottom of the mold, care being taken to avoid the presence of bubbles in contact with the glass members. To do this, the mold may be placed under vacuum beforehand. After a few hours the product can be demolded.

A transparent block is obtained which has a tensile strength of 850 MPa in a direction situated in the plane of the sheets, an elasticity modulus in the same direction of 18,000 MPa, an impact strength of 40 kJ/m² and a compressive strength of 115 MPa in the direction perpendicular to the preceding one.

EXAMPLE 7

Manufacture of transparent solid posts with good flexural strength and resistance to buckling Members (A2) and fibers (B) as defined in Examples 1 and 4 are employed; to form the resin (C) a mixture of styrene (approximately 70%) and of methyl methacrylate (approximately 30%) is prepared, copolymerized in an oven under the action of benzoyl peroxide.

Molding of a cylinder of small diameter and great length is carried out first of all by using the mixture of resin + members (A2). After demolding, the cylinder is wrapped in roving impregnated with the resin which is made viscous by heat. It is then pushed into a die which makes its outer surface uniform.

EXAMPLE 8

Manufacture of different solid posts (FIGS. 8a to 8d)

Members (A2) as defined in Examples 1 and 4 and long fibers (B) of R glass as defined in these same examples are employed; in the case of the resin (C), the mixtures as also defined in these same examples are prepared.

Figure 8A:
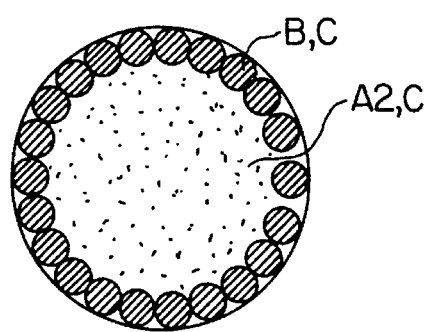
FIGS. 8a to 8d are views in cross-section of elongate structural members in accordance with four other embodiments of the invention.
Figure 8B:
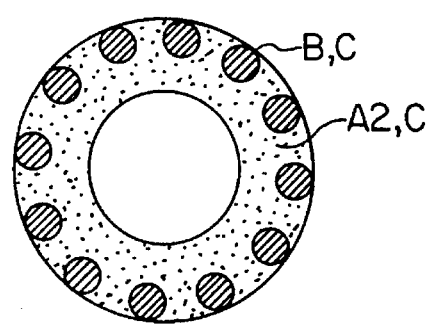
Figure 8C:
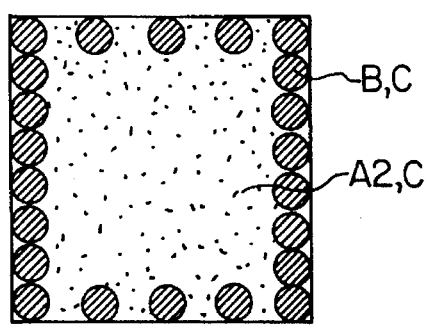

Sticks comprising long fibers impregnated with resin (more than 50% by weight of glass) are produced first of all by pultrusion. These sticks are placed against the wall of an elongate cylindrical mold, which is then filled with resin (C) + members (A2). A view of the post in cross-section is shown in FIG. 8a.

Figure 8D:
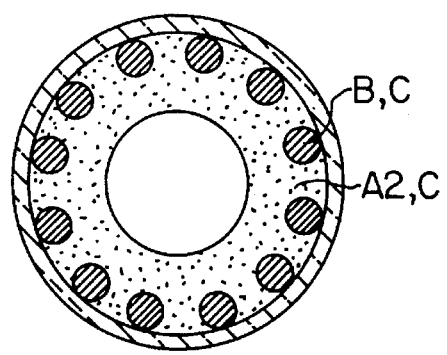

Alternative forms of this process are possible: it is possible to leave a cylindrical hole in the center (FIG. 8b), to employ a mold of rectangular or square section (FIG. 8c), to distribute the sticks differently (FIGS. 8c to 8d), and to cover the outer surface with a layer (B + C) comprising an impregnated fabric (FIG. 8d).

EXAMPLE 9

Manufacture of an electrical post in the form of an elongate conical frustum

Members (A2), fibers (B) and resin sticks (C) as defined in Example 8 are employed.

Figures 9A, 9B:
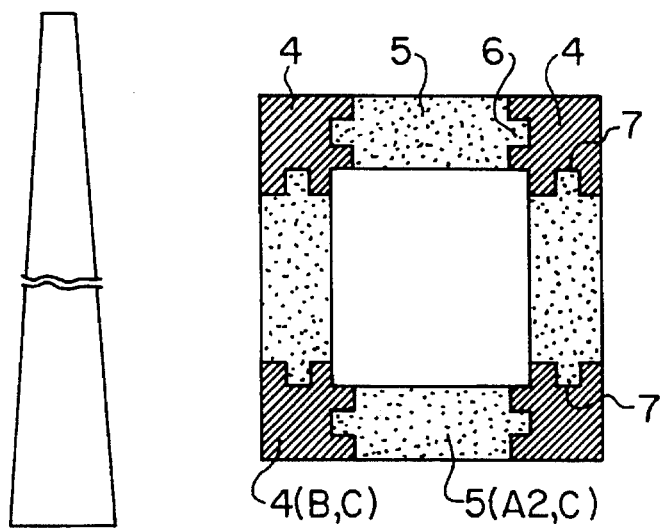
FIG. 9a is an elevation view of another elongate structural member according to the invention and FIG. 9b is a view in cross-section of this member, on a larger scale.

On the one hand, sections 4 consisting of long fibers (B) impregnated with resin (C) are manufactured by pultrusion and, on the other hand, sections 5 consisting of a resin (C) matrix in which glass particles (A2) are embedded are manufactured. The former are intended to constitute corner members, and the latter side members, making it possible to produce an electrical post in the form of an elongate conical frustum shown in elevation in FIG. 9a and in cross section, on a larger scale, in FIG. 9b. The sections 5 forming the faces comprise, on either side, lengthwise ribs 6 intended to interact with corresponding grooves 7 made in the corner sections 4. This tenon-mortise assembly is consolidated by adhesive bonding. The fiber sections 4 are therefore situated in the places working in tension, and the sections containing particles 5 in the places working in compression.

To manufacture a post of this form it is also possible to employ a mold of corresponding shape in which corner sections containing fibers and obtained by pultrusion are arranged and which is then filled with a mixture of resin and particles.

EXAMPLE 10

Manufacture of a transparent sheet which has high mechanical properties

Use is made of members (A2) consisting of glass beads of very small diameter, which have the following composition:

$SiO_2$: 70%,
$Al_2O_3$: 3.5%,
$CaO + MgO$: 7%,
$B_2O_3$: 16–17%,
$Na_2O$: 1.3%,
$K_2O$: 1.5%, and whose refractive index is 1.495, and of fibers (B) which are in the form of a fiber fabric of a glass which has the same composition; in the case of the resin (C) a mixture of two prepolymers is prepared: polymethyl methacrylate with a refractive index of 1.4893 and transparent polyurethane with a refractive index of 1.505, adjusted by adapting the proportions of the mixture around the composition 66% PMMA/34% PU.

The glass beads are incorporated into the resin when hot, and the resulting intermediate product; and is extruded by rolling between two glass fiber fabrics to obtain the required transparent sheet.

EXAMPLE 11

Manufacture of different structural members comprising polyamide fibers

Transparent fibers of aromatic polyamides (PA6) are employed, whose index, measured in the transverse direction of the fiber, is 1.515. Beads of an extra-white soda-lime glass are then employed, whose index is adjusted to the exact value of the index of the fiber using the relative proportions of CaO and of MgO and/or those of $Na_2O$ and of $K_2O$, and which has the following composition:

$SiO_2$: 73.57%,
$SO_3$: 0.250%,
$Na_2O$: 13.85%,
$K_2O$: 0.022%,
$CaO$: 10.31%,
$MgO$: 0.046%,
$Al_2O_3$: 1.901%,
$B_2O_3$: 0.012%,
$CeO_2$: 180ppm,
Se: 3.0 ppm,
CoO: 1 ppm.

It is clear that the embodiments described above are not limiting in any way and can give rise to any desirable modifications without departing thereby from the scope of the invention.

What is claimed is:

1. A transparent composite structural member capable of withstanding mechanical stresses, comprising:
    at least one transparent glass member selected from the group consisting of stem, reed, tube, strip, sheet, bead, particle and fragment;
    transparent fibers;

a cured transparent resin, in which said transparent fibers are imbedded, and in which said at least one transparent glass member, to the extent consisting of bead, particle and fragment is imbedded;

said transparent fibers, and said resin, being bonded to said at least one transparent glass member to the extent consisting of stem, reed, tube, strip and sheet;

said cured resin exhibiting a refractive index which, at a wavelength of 510 to 520 nm, does not differ by more than 0.01 from that of said transparent fibers and from that of said at least one transparent glass member;

said transparent fibers being preferentially located in a region of said member which are at least one of: subject to maximum tensile stress and subject to impact, in use; and said at least one glass member being preferentially located in a region of said member which are at least one of: subject to maximum compressive stress and required to be of greatest rigidity.

2. The structural member of claim 1, wherein:

said cured resin exhibits a refractive index which, at a wavelength of 510 to 520 nm, does not differ by more than 0.001 from that of said transparent fibers and from that of said at least one transparent glass member.

3. The structural member of claim 1, wherein:

said at least one transparent glass member is present as a plurality of beads of mixed size.

4. The structural member of claim 1, wherein:

said at least one transparent glass member is present as a plurality of particles of mixed size.

5. The structural member of claim 1, wherein:

said fibers are made of a material selected from glass, silica and aromatic polyamide.

6. The structural member of claim 1, wherein:

said fibers are present as a filamentary winding of roving.

7. The structural member of claim 1, wherein:

said fibers are present as a fabric.

8. The structural member of claim 1, wherein:

said cured transparent resin is at least one polymer or copolymer selected from the group consisting of unsaturated polyesters, polyurethanes, polyalkyl methacrylates, cross-linked by addition of a functionalized (meth)-acrylate, partially cross-linked polybutadienes, interpenetrating networks of styrene and urethane, semiinterpenetrating networks of styrene and urethane, interpenetrating networks of alkyl methacrylate and urethane, semiinterpenetrating network of alkyl methacrylate and urethane, polymers and copolymers of styrene, alkyl methacrylate, vinyl chloride, vinyl acetate, vinyl alcohol, acrylonitrile, polycarbonates, polyaromatics, polyamides and polycellulosics.

9. The structural member of claim 1, wherein:

said cured transparent resin is bonded to said transparent fibers and to said at least one transparent glass member at least partly by being directly adhered thereto.

10. The structural member of claim 1, further including:

a sizing; said cured transparent resin being bonded to said transparent fibers and to said at least one transparent glass member at least partly via said sizing.

11. The structural member of claim 1, further including:

a transparent plastic material having a coefficient of thermal expansion which is intermediate the range of those of said transparent fibers, said at least one transparent glass member and said cured transparent resin; said cured transparent resin being bonded to said transparent fibers and to said at least one transparent glass member at least partly via said transparent plastic material.

12. The structural member of claim 1, wherein:

said at least one transparent glass member is constituted by a plurality of transparent glass members selected from the group consisting of stem, reed, tube, strip and sheet; and said transparent glass members are bonded together by said cured transparent resin.

13. The structural member of claim 1, wherein:

said structural member is an elongated member selected from the group consisting of a pillar, pylon, post, beam and arch; and at least part of said at least one transparent glass member is arranged to provide at least part of a backbone of said structure and surrounded by said cured transparent resin.

14. The structural member of claim 13, wherein:

said at least one transparent glass member of said backbone is selected from the group consisting of a tube, a stem, a core of fragments, a core of beads, a stem surrounding a core of fragments, a stem surrounding a core of beads, a tube surrounding a core of fragments, a tube surrounding a core of beads, a bundle of reeds, a bundle of stems, said beads and fragments being imbedded in said cured transparent resin, and an assembly of sheets forming an elongated hollow core having a polygonal transverse cross-sectional shape; and further including:

a sheath surrounding and integrally attached to said backbone, said sheath comprising at least one sheathing layer selected from the group consisting of a filamentary winding around said backbone of glass fiber roving impregnated with said cured transparent resin, and a wrapping around said backbone of glass fiber fabric impregnated with said cured transparent resin.

15. The structural member of claim 14, further comprising:

a layer of sizing interposed between said backbone and a radially innermost said sheathing layer; said sizing having a coefficient of thermal expansion which is intermediate those of said backbone and said sheath.

16. The structural member of claim 14, wherein:

said at least one transparent glass member of said backbone consists of a tube; and said at least one sheathing layer consists of a filamentary winding around said backbone of glass fiber roving impregnated with said cured transparent resin.

17. The structural member of claim 16, wherein:

said sheath comprises from 2 to 20 of said sheathing layers.

18. The structural member of claim 16, wherein:

said sheath comprises from 4 to 10 of said sheathing layers.

19. The structural member of claim 14, wherein:

said filamentary winding is a helical winding.

20. The structural member of claim 16, wherein:

said sheath comprises at least two of said sheathing layers, and in each of at least two radially adjoining ones of said sheathing layers, said filamentary winding is opposingly helical.

21. The structural member of claim 16, wherein:

said filamentary winding is circumferentially convolute.

22. The structural member of claim 1, further comprising:

an outer layer of varnish for protecting said structural member against oxidation and ultraviolet radiation.

23. A method for manufacturing a structural member capable of withstanding mechanical stresses, comprising:

(a) performing filamentary winding of a transparent glass fiber roving impregnated with a curable resin which, when cured, is transparent, around a transparent glass tube, so as to provide a sheath having at least one layer of winding;

(b) initiating gelling of said resin;

(c) immediately after said gelling begins, winding around said sheath, a film of a material which is neutral towards said resin and capable of protecting said member from oxidation from externally thereof, and thereby leveling external surface microcorrugations on said member;

(d) maintaining the member at a temperature of 15° C. to 40° C. for a period of from 1 to 10 hours and thereby permitting said resin to cure; and (e) thereafter, unreeling said film from around said member.

24. The method of claim 23, further comprising:

subsequent to step (e), externally working on said member for eliminating surface defects due to contact of said film with said member during step (d).

25. The method of claim 23, further comprising:

subsequent to step (e), applying externally to said structural member, a layer of varnish for protecting said structural member against oxidation and ultraviolet degradation from externally thereof.

26. The method of claim 23, further comprising:

prior to step (a), coating said tube with a layer of sizing for improving bonding of said sheath to said tube.

27. The structural member of claim 1, wherein:

said structural member is tubular.

28. The structural member of claim 1, wherein:

said structural member is a sheet.

29. The structural member of claim 1, having at least one first portion stressed in tension and at least one second portion stressed in compression;

said first portion incorporating said fibers, and said second portion incorporating said at least one transparent glass member as a plurality of members selected from the group consisting of beads, particles and fragments.

30. The structural member of claim 29, further comprising:

an external surface layer of glass fiber fabric impregnated with an amount of said cured resin.

* * * * *